United States Patent
Tsujiuchi et al.

(10) Patent No.: US 7,760,249 B2
(45) Date of Patent: Jul. 20, 2010

(54) IMAGE RECORDING AND PLAYING SYSTEM AND IMAGE RECORDING AND PLAYING METHOD

(75) Inventors: Masaya Tsujiuchi, Yokohama (JP); Takashi Morimoto, Ome (JP); Yoshifumi Takayama, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 671 days.

(21) Appl. No.: 11/679,350

(22) Filed: Feb. 27, 2007

(65) Prior Publication Data

US 2008/0024799 A1   Jan. 31, 2008

(30) Foreign Application Priority Data

Jul. 28, 2006   (JP)   ............................. 2006-205622

(51) Int. Cl.
  H04N 5/76   (2006.01)
(52) U.S. Cl. .............................. 348/231.99; 348/231.2; 348/699; 348/700
(58) Field of Classification Search .............. 348/207.2, 348/231.99–231.9, 699, 700
See application file for complete search history.

(56) References Cited

U.S. PATENT DOCUMENTS 6,118,925 A * 9/2000 Murata et al. .................. 386/83

| 2003/0151688 | A1* | 8/2003 | Tojo ............................ 348/345 |
| 2003/0195883 | A1 | 10/2003 | Mojsilovic et al. |
| 2004/0189691 | A1 | 9/2004 | Jojic et al. |
| 2006/0120624 | A1 | 6/2006 | Jojic et al. |
| 2006/0143650 | A1 | 6/2006 | Tanikawa et al. |

FOREIGN PATENT DOCUMENTS

| JP | 2005-039579 | 2/2005 |
| JP | 2005-223854 | 8/2005 |

* cited by examiner

*Primary Examiner*—Sinh Tran
*Assistant Examiner*—Anthony J Daniels
(74) *Attorney, Agent, or Firm*—Oblon, Spivak, McClelland, Maier & Neustadt, L.L.P.

(57) ABSTRACT

An image recording and playing system includes: an image pickup unit that takes an image; a processing unit that performs an image processing of the image data obtained by the image pickup unit; a display unit that displays an image based on an image processing result; and a memory that stores an image data based on the image processing result, wherein the processing unit includes: a dissimilar image extracting element that determines whether the each extracting objection image data preliminarily read is a dissimilar image data to the image data obtained by the image pickup unit and extracts image data determined as the dissimilar image data; a data storing element that stores the dissimilar image data; and a thumbnail image creating unit that extracts image data similar to a typical-pattern image data extracted from among the dissimilar image data, and creates thumbnail image data.

8 Claims, 7 Drawing Sheets

IMAGE RECORDING AND PLAYING SYSTEM AND IMAGE RECORDING AND PLAYING METHOD

CROSS REFERENCE TO RELATED APPLICATIONS

The application is based upon and claims the benefit of priority from the prior Japanese Patent Application No. 2006-205622, filed on Jul. 28, 2006, the entire contents of which is incorporated herein by reference.

BACKGROUND OF THE INVENTION

1. Field of the Invention

The present invention relates to an image recording and playing system in a device that can use an image of a digital camera, a mobile phone and a portable multimedia player. In particular, the present invention relates to an image recording and playing system and an image recording and playing method that are convenient for deleting image data recorded to a memory.

2. Description of the Related Art

With a digital camera used as a conventional image recording and playing system, the play and erasure are easy and a large amount of image (image data) of the same subject such as a person is captured in many cases. Therefore, in the case of memory shortage, a user himself/herself selects one of a large number of images and deletes the image data. That is, when the user deletes the image data, first, the user needs to check each image data.

The above-mentioned image recording and playing system is disclosed in JP-A 2000-137722 (Kokai). JP-A 2000-137722 discloses an example in which an image recording and playing system 1 is applied to a laboratory system for automatically printing out data obtained by taking (imaging) a photography by a user himself/herself, as shown in FIGS. 9 to 11.

FIG. 9 is a functional block diagram showing the entire control system of the image recording and playing system 1. FIG. 10 is a functional block diagram showing an image processing unit shown in FIG. 9. FIG. 11 is a flowchart showing a grouping processing routine shown in FIG. 9.

Referring to FIG. 9, the image recording and playing system 1 comprises: an input unit 2 that receives image data; a data converter 3 that converts the received image data into image data; an image processing unit 4 that performs predetermined image processing of the converted image data; a memory unit 5 that stores the data after the image processing; a display unit 6 that displays the received image data and sets an arbitrary mode; an output unit 7 that controls an output of a desired image; a charge calculating unit 8 that calculates a printing charge; a charge input unit 9 that determines whether or not a predetermined charge is input; and a control unit 10 that entirely controls the blocks 2 to 9.

Referring to FIG. 10, the image processing unit 4 comprises a feature extracting element 11, a similarity determining element 12, a grouping element 10, and a taking-state determining element 14.

With the above-mentioned image recording and playing system 1, as shown in FIG. 11, image processing is performed in accordance with the grouping processing routine. That is, the processing starts and it is determined, on a screen for displaying the image, whether or not a grouping mode is selected (in step S1).

If it is determined that the grouping mode is selected, it is determined whether or not the grouping reference is a scene (in step S2).

When it is determined that the grouping reference is the scene, the input RGB data is converted into HSB data (in step S3).

Then, the histograms are created every H (Hue), S (Saturation), and B (Brightness) of the images (in step S4).

After ending the histogram of the image data in a first page, data on the created histogram is stored in the memory unit. With respect to pages subsequent to the first page, the histogram data is sequentially created and is stored in the memory unit, and H, S, and B patterns are created for the image data in all pages and are stored (in step S5).

The histogram patterns of H, S, and B for the image data in all pages are read from the memory unit (in step S6).

Subsequently, the pattern matching is executed every image in the pages (in step S7).

It is determined whether or not the difference between the histogram patterns of compared images is less than a threshold value (in step S8).

If it is determined in step 8 that the difference is less than a threshold value, it is determined whether or not the images in the pages have an image obtained by taking the same scene (in step S9).

The processing for reading the histogram pattern, executing the pattern matching, and determining the same scene is iterated for the image data in all pages and is then ended (in step S10).

After ending the determination of all the images with the same scene, the photographic images determined with the same scene are grouped on the memory unit (in step S11).

As mentioned above, with the image recording and playing system 1, even if there is a large amount of photographic data, the processing in steps S1 to S11 can automatically and easily group the photographic data every similar scene without manual operation.

With the conventional image recording and playing system 1, even if there is a large amount of photographic data, the photographic data can be automatically and easily grouped every similar scene without manual operation. Accordingly, upon selecting a desired image, the image data can be roughly searched every group.

Therefore, the user can relatively easily select the image data to be viewed and the image data to be deleted by the user.

However, with the image recording and playing system 1, even if the data can be roughly searched every group, the user needs to visually check all the amount of raw image data as a search target based on the group unit one by one and, particularly when the amount of image data is large, the check operation is troublesome and large labor is required.

SUMMARY OF THE INVENTION

The present invention is devised in consideration of the above points and it is an object of the present invention to provide an image recording and playing system and an image recording and playing method, by which a camera as an image processing playing system takes an image and the atomization of search operation of a large amount of image data stored in an image data memory is improved, thereby the search operation of the image data of a user is further easy.

In order to accomplish the object, according to the present invention, there is provided an image recording and playing system comprises: an image pickup unit that takes an image; an image processing unit that performs image processing of the image data obtained by taking with the image pickup unit;

an image display unit that displays an image on the basis of an image processing result obtained by the image processing with the image processing unit; and an image data memory that stores an image data on the basis of the image processing result, wherein the image processing unit includes: a dissimilar image extracting element that reads extracting objection image data, determines whether the each extracting objection image data is a dissimilar image data to the image data obtained by taking with the image pickup unit, and extracts image data determined as the dissimilar image data; an image data storing element that stores the dissimilar image data; and a thumbnail image creating unit that extracts one of the dissimilar image data stored in the image data storing element, sets the extracted image data as a typical-pattern image data, extracts a plurality of image data similar to the typical-pattern image data, and creates thumbnail image data.

In order to accomplish the object, according to the present invention, there is provided an image recording and playing method comprises the steps of: searching dissimilar-image-data from stored image data; selecting typical-pattern image data from the image data obtained by the dissimilar-image-data search step; searching thumbnail image data similar to the typical-pattern image data; displaying a thumbnail image based on the searched thumbnail image data; grouping a similar image every the displayed thumbnail image; and relatively determining the grouped plurality of images on the basis of the unsharpness as the reference.

In order to accomplish the object, according to the present invention, there is provided an image recording and playing method comprising the steps of: searching dissimilar-image-data of recorded image data; selecting typical-pattern image data from among the image data obtained by the search step; searching thumbnail image data similar to the typical-pattern image data; displaying a thumbnail image based on the searched thumbnail image data; grouping a similar image every the displayed thumbnail image; and relatively determining the plurality of grouped images on the basis of the unsharpness as the reference and displaying the determination result for the individual plurality of images.

With the image recording and playing system according to the present invention, a large amount of the image data stored in the image data memory can be displayed as thumbnail images on an image display unit. Therefore, it is possible to provide an image recording and playing system and an image recording and playing method, by which the user can easily and simply perform the search operation of the image data and the deletion of an unnecessary image.

BRIEF DESCRIPTION OF THE DRAWINGS

FIG. 5A is a diagram showing a relationship between the search target image and the dissimilar image; and FIG. 5B is a diagram showing a correlation between a searched dissimilar image and the search target image;

FIG. 8A is a diagram showing a thumbnail image of the typical pattern image, and FIG. 8B is a diagram showing individual images included in one thumbnail image of the typical pattern image shown in FIG. 8A;

DESCRIPTION OF THE PREFERRED EMBODIMENTS

Hereinbelow, a description will be given of an image recording and playing system according to an embodiment of the present invention with reference to the accompanying drawings.

Figure 1:
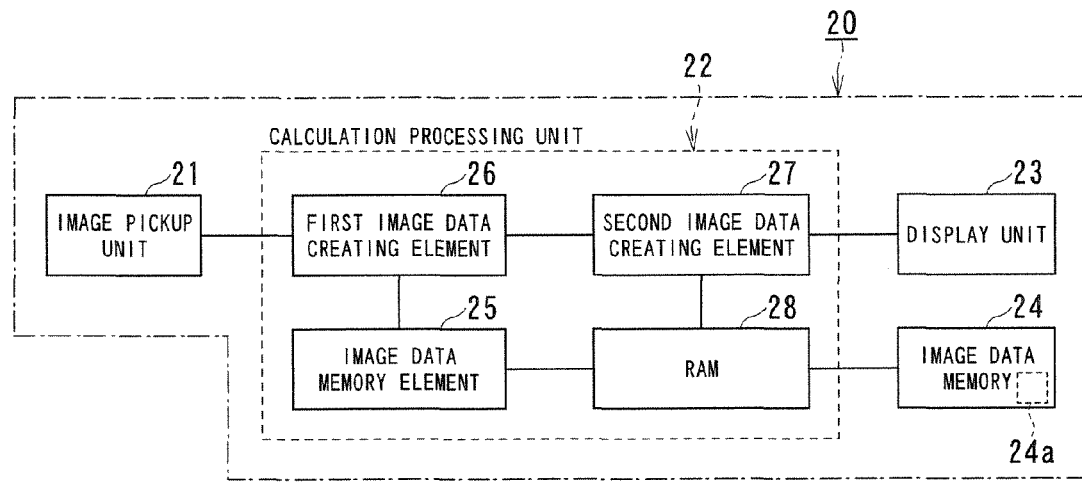
FIG. 1 is a block diagram schematically showing an image recording and playing system according to the present invention.
Figure 2:
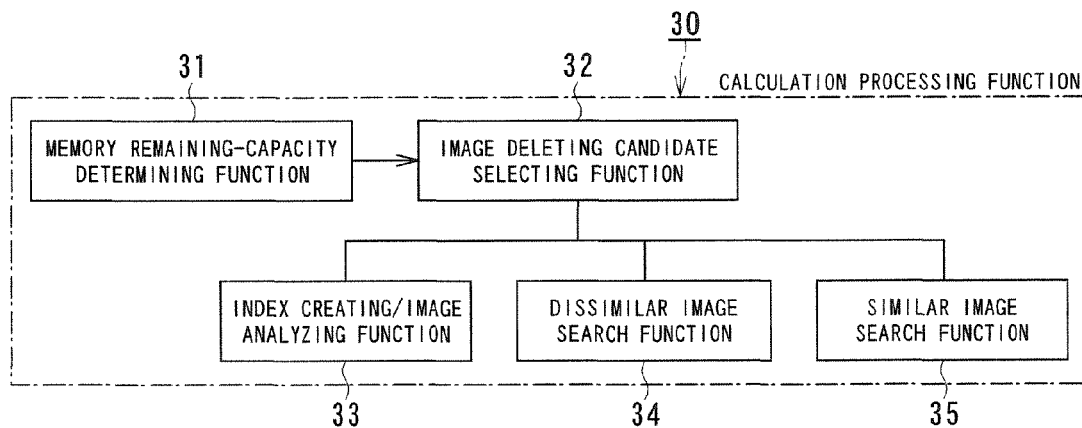
FIG. 2 is a block diagram for illustrating functions of a calculation processing unit with the image recording and playing system according to the present invention.
Figure 3:
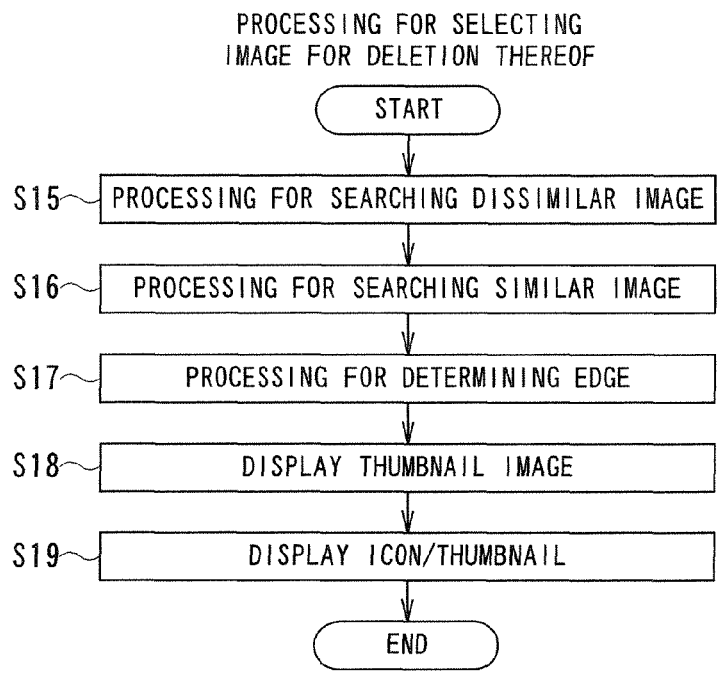
FIG. 3 is a flowchart for illustrating a function for selecting an image deleting candidate in the image recording and playing system according to the present invention.

FIG. 1 is a block diagram schematically showing an image recording and playing system 20 according to the present invention. FIG. 2 is a block diagram showing a function (hereinafter, referred to as "calculation processing function") 30 of the calculation processing unit 22 in the image recording and playing system 20 according to the present invention. FIG. 3 is a flowchart for illustrating a function for selecting an image deleting candidate with the image recording and playing system 20.

Referring to FIG. 1, the image recording and playing system 20 is an image recording and playing system disposed at a device with a camera function, such as a Charge Coupled Device (hereinafter, referred to as "CCD") camera or a mobile phone, capable of being easily used by a user. The image recording and playing system 20 comprises: an image pickup unit 21 that takes an image; a calculation processing unit 22 that performs calculation processing of image data "a" obtained by taking with the image pickup unit 21; an image display unit 23 that displays the image on the basis of image processing data "a'" obtained by the calculation processing with the calculation processing unit 22; and an image data memory 24 that stores the image processing data "a'" obtained by the calculation processing with the calculation processing unit 22. Incidentally, the numeral reference 24a denotes an image table data memory.

The image pickup unit 21 includes a lens and image pickup element such as a CCD (not shown), and further comprises an optical system for taking a still image and a moving image.

The calculation processing unit 22 includes: an image data storing element 25 that stores dissimilar image data "a1" of an image on the basis of the image data "a" taken by the image pickup unit 21; an image data control element (hereinafter, referred to as "first image-data creating element") 26 that extracts specific typical-pattern image data "ax" from the dissimilar image data "a1" stored in the image data storing element 25 and creates image data "a11" similar to the extracted image data "ax"; an image data processing element (hereinafter, referred to as "second image-data creating element") 27 that extracts a plurality of image data "a11" similar to the typical-pattern image data "ax" and creates thumbnail image data "a4"; and a Random Access Memory (hereinafter, referred to as "RAM") 28 that is used for various image processing. That is, The RAM 28 can store data for using various image processing, e.g., the calculation value (differential value) of the color histograms such as H (hue), S (saturation), and B (brightness) of the color space of the image between the dissimilar image data and the image data as the search target.

The image display unit 23 receives various image data output from the calculation processing unit 22, i.e., the image processing data "a'", the dissimilar image data "a1" (a11), the thumbnail image data "a4", and the typical-pattern image data "ax" and displays them on the screen.

Further, the image data memory 24 can store a plurality of pieces of the typical-pattern image data "ax" recognized by the first image-data creating element 26. For example, the image data memory 24 can store four pieces of the typical-pattern image data "ax" arbitrarily selected by the user.

The image data storing element 25 has a function for temporarily storing data and can store the image data such as the dissimilar image data "a1".

The first image-data creating element 26 includes a memory remaining-capacity determining function 31 and an image deleting candidate selecting function 32, as shown in FIG. 2.

The memory remaining-capacity determining function 31 is disposed at, e.g. the image data storing element 25 in the calculation processing unit 22, and can use, as the determining reference, a memory capacity necessary for taking one image. Incidentally, the memory remaining-capacity determining function 31 may be disposed at the RAM 28 and may further be functioned in cooperation with the image data storing element 25 and the RAM 28.

Further, the image deleting candidate selecting function 32 has an index creating/image analyzing function 33, a dissimilar image search function 34 and a similar image search function 35. For example, the index creating/image analyzing function 33 and the dissimilar image search function 34 are realized by the first image-data creating element 26, and the similar image search function 35 is realized by the second image-data creating element 27.

Figure 4:
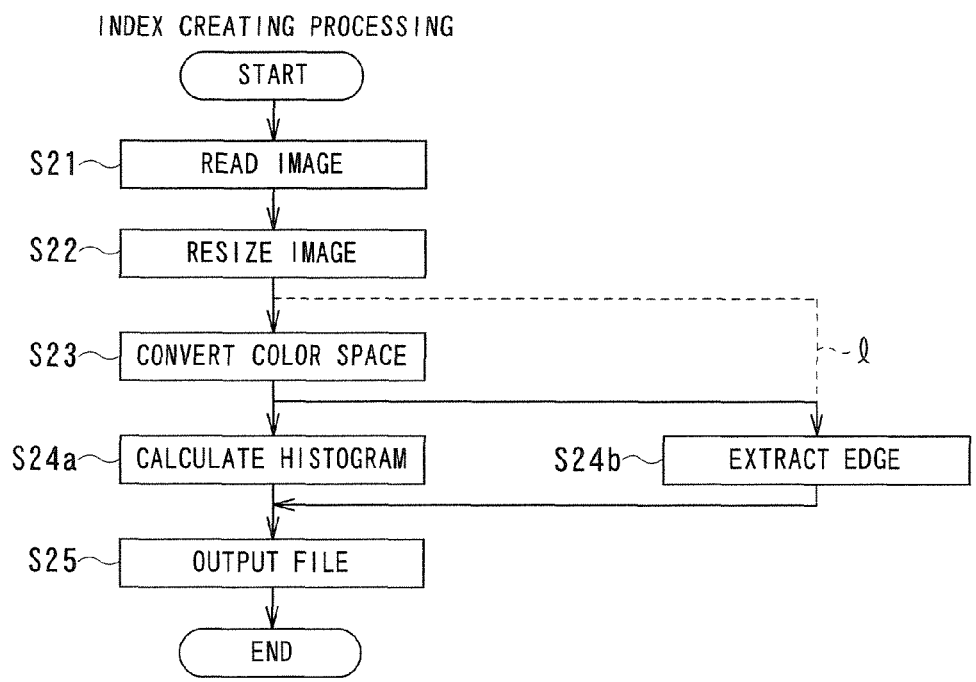
FIG. 4 is a flowchart for illustrating a function of index creating processing in the image recording and playing system according to the present invention.

The index creating/image analyzing function 33 is a module for creating necessary index data upon executing image search/determination of image sharpness (shaking, out-of-focusing, and contrast defect). That is, as shown in FIG. 4, the index data is created by processing for reading the image (step S21), processing for resizing the image (step S22), processing for converting the color-space (step S23), processing for converting the histogram (e.g., color histogram of the image) (step S24a), processing for searching for the edge (step S24b), and processing for outputting a file (step S25).

Specifically, an image file read by the processing for reading the image (step S21) may be non-compression image data, such as BMP, or (lossy/lossless) compression image data such as an image based on JPEG.

In processing for resizing the image (step S22), pixels are thinned-out from the original image so as to resize (rescale) the image and, as a consequence, the memory consumption can be suppressed and the amount of calculation can be reduced. In this case, the size for resizing the image can be, for example, 32×32 pixels.

In the processing for converting the color-space (step S23), the image data in RGB (or YCbCr) color space is converted into colors in HSB space (hue, saturation, and brightness).

Further, in the processing for calculating the histogram (step S24a), the histograms for H (hue), S (saturation), and B (brightness) are obtained every image in regions obtained by dividing the resized image subjected to the color space conversion into three sections in the horizontal and vertical directions.

Further, the edge search processing (step S24b) has two methods. A value calculated by any of the two methods can be set as the sharpness of the image. According to one of the two methods, an edge is detected with Wavelet conversion. As shown in FIG. 4 (step S24b), after performing the color space processing, the regions are divided into three sections in horizontal and vertical directions and the H (hue) component every image in the regions is subjected to Wavelet conversion. Further, the sum of diagonal components of the obtained Wavelet coefficients is calculated.

Subsequently, according to the other method, an edge is detected with an edge detecting filter such as Laplacian filter.

Specifically, as shown by a dotted line in FIG. 4, from the next step of the image resizing processing (step S22), the processing enters the edge search processing (step S24b). That is, after performing the image resizing processing, for example, the regions are divided into three sections in the horizontal and vertical directions and the R, G, and B components in the regions are subjected to Laplacian filtering (edge processing of the image). Further, when a value of the components through Laplacian filtering is not less than a threshold value, the region is determined as an edge and is counted-up as the edge.

Further, in the file output processing (step S25), the obtained histogram calculation value and edge detection value are outputted as a file.

Figure 5A:
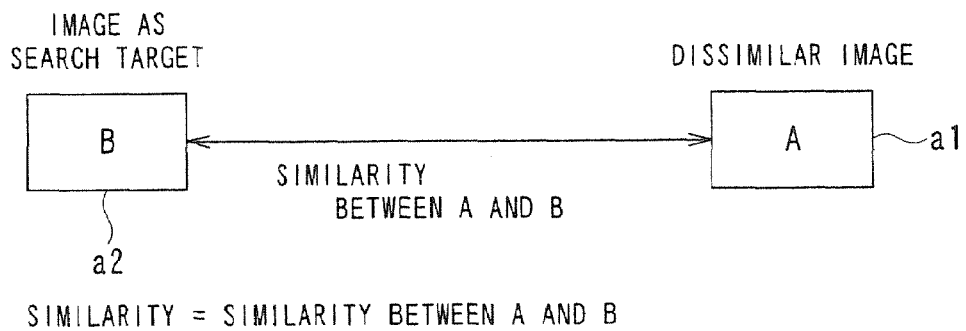
FIGS. 5A and 5B are diagrams showing comparison relationships between a search target image and a dissimilar image in the image recording and playing system according to the present invention.
Figure 5B:
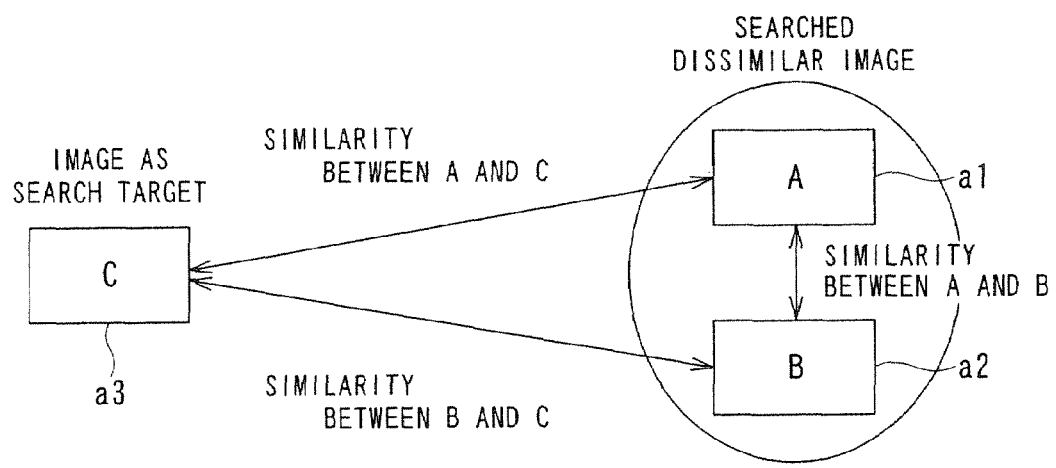

Further, the dissimilar image search function 34 has a function for searching the dissimilar-image as shown in FIGS. 5A and 5B. Specifically, for the sake of searching the dissimilar-image, first, the dissimilar image search function 34 determines dissimilar image data "a2" (search target image B shown in FIG. 5A) whose similarity, to the dissimilar image data A as the dissimilar image data "a1" (dissimilar image A shown in FIG. 5A) given by the user, is not more than a desired threshold value and is the lowest one.

Next, the dissimilar image search function 34 determines dissimilar image data "a3" (search target image C shown in FIG. 5B) when the similarity between the dissimilar image data A as the dissimilar image data "a1" and the target image data C as the dissimilar image data "a3" and the similarity between the dissimilar image data B as the dissimilar image data "a2" and the target image data C as the dissimilar image data "a3" are not respectively more than a desired threshold value, and the sum of the respective similarities thereof is minimized. The dissimilar image search function 34 has a function for setting the dissimilar image data a1, a2, and a3 as typical-pattern image data "as".

Figure 6:
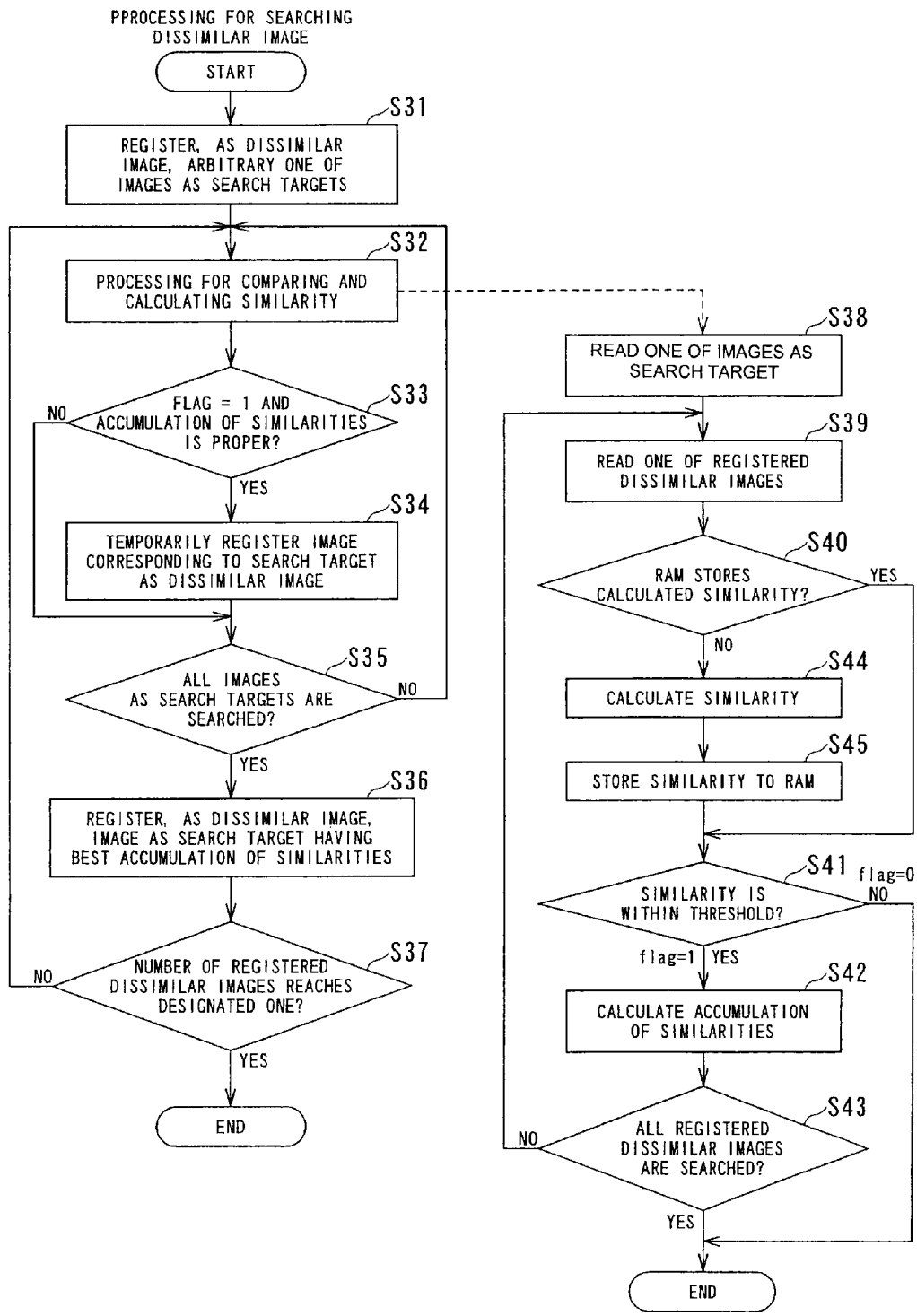
FIG. 6 is a flowchart for illustrating a function of dissimilar image search processing in the image recording and playing system according to the present invention.

More specifically, the dissimilar image search function 34 performs dissimilar-image-data search process as shown in FIG. 6. Referring the FIG. 6, one image is arbitrarily registered from among the specified search target images "a" as a dissimilar image in step S31. Subsequently, similarity comparison and calculation processing for extracting the image data similar to one piece of the dissimilar image data a1 is performed in step S32. As a result of this processing, if the similarity has a value within a threshold value determined in advance as the reference one, flag=1 is set and the processing advances to step of calculating the accumulated similarities.

Subsequently, it is checked whether the accumulated similarities are proper (e.g., minimum value) in step S33. In the event that flag=1 is set and the accumulated similarities are proper (in case of YES in step S33), the image as a search target is temporarily registered as a non-similar image in step S34. Subsequently, it is checked whether all the images as search targets are searched in step S35. Incidentally, if flag=0 in step S33 (in case of NO in step S33), the processing advances to step S35.

Subsequently, after completion of performing step S35, the image as the search target having the optimum (best) accumulated similarities is registered as a non-similar image in step S36.

Subsequently, it is checked whether the number of the dissimilar images registered in step S36 reaches a designated (desired) one in step S37.

If it is determined that the number of the dissimilar images registered in step S36 does not reach a designated (desired) one (in case of NO in step S37), the processing returns to step S32. That is, one image data is read from the image data as the search target (step S38).

Subsequently, one image data is read from the dissimilar image data registered in step S37 (step S39). Further, it is checked to see if the RAM 28 stores data on the similarity that has been calculated (step S40). That is, when the RAM 28 has already stored the differential value (calculation value) of the histograms between the dissimilar image data and the image data as the search target, it is determined whether or not the similarity is within a threshold value (step S41). If it is determined that the similarity is within the threshold value, flag=1 is set and the accumulation of similarities is calculated (step S42). If it is determined that the similarity is out of the threshold value, flag=0 is set and the processing stops. Subsequently, it is checked whether all the registered dissimilar image data is searched (step S43).

If it is determined that the RAM 28 does not store the differential value, the image data as the search target is read and the difference of the histograms between the dissimilar image data and the image data as the search target is calculated (step S44). Subsequently, in step S45, the RAM 28 stores the similarity.

As mentioned above, the dissimilar image search function 34 realizes the dissimilar image search function by performing step S31 to step S43 or step S1 to step 45.

Referring to FIG. 2, a similar image search function 35 has a function for specifying one dissimilar image data "a1" from among the image data "a" taken by the image pickup unit 21 and the image data "a" stored in the image data storing element 25, recognizing the specified dissimilar image data "a1" as the typical-pattern image data "ax" (storing the specified data to the image data storing element 25), and searching the image data "a" similar to the recognized typical-pattern image data "ax".

Figure 7:
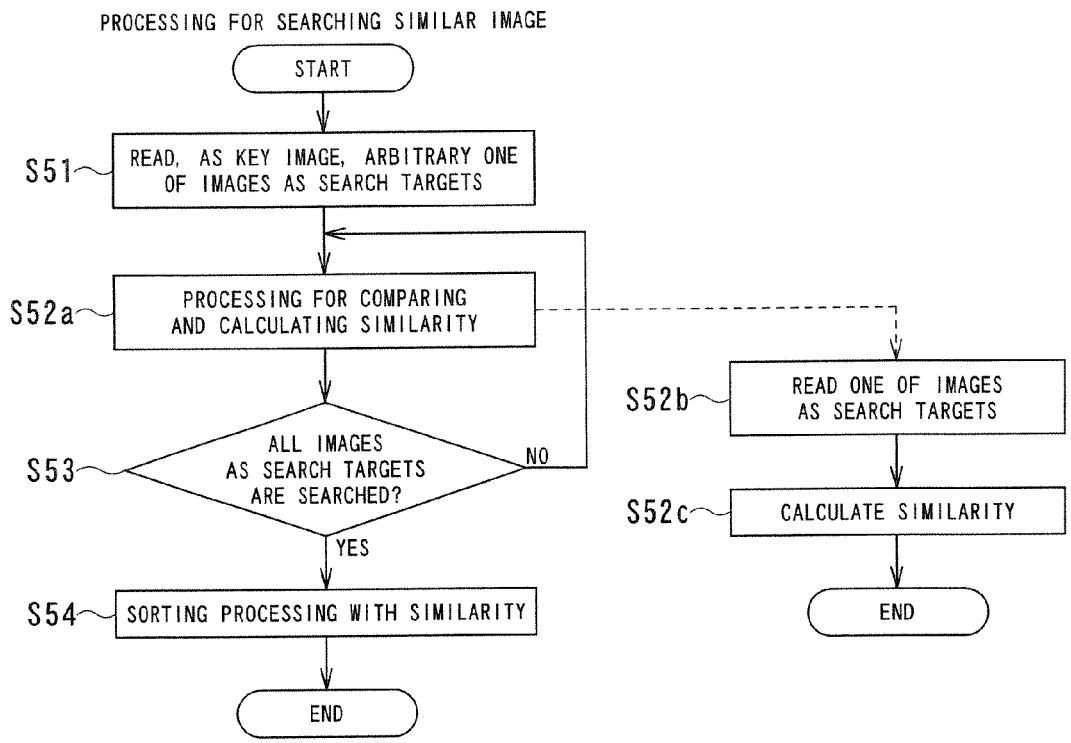
FIG. 7 is a flowchart for illustrating a function of similar-image search processing in the image recording and playing system according to the present invention.

The similar image search function 35 specifies one dissimilar image data "a1" from among the image data "a" taken by the image pickup unit 21 and the image data "a" stored in the image data storing element 25, recognizes the specified dissimilar image data "a1" as the typical-pattern image data "ax", and searches the image data "a" similar to the recognized typical-pattern image data "ax" by performing similar image search process as shown in FIG. 7.

Specifically, referring to FIG. 7, first, one arbitrary image as a key image is read in (step S51). At step S51, the actually read data is index data obtained by the index creation/image analyzing function 33, corresponding to an arbitrary image. In similarity comparison and calculating processing in step S52a, the index data corresponding to the image as the search target is read in step S52b, and the difference between the histograms between the read index data and the key image is calculated.

In step 52c, it is determined whether or not the image having the difference not less than the threshold value at this time is a similar image.

The RAM 28 stores data as the reference of the level (frequency threshold value) of the similarity in the similarity comparing and calculating processing of a predetermined number of the image data "a11" similar to one dissimilar image data "a1" registered in the first image-data creating element 26. With respect to the data, the user can arbitrarily select and set the level of similarity.

Next, a description will be given of the operation of the image recording and playing system 20 with reference to FIGS. 1 to 3 and 8A and 8B.

Figure 8A:
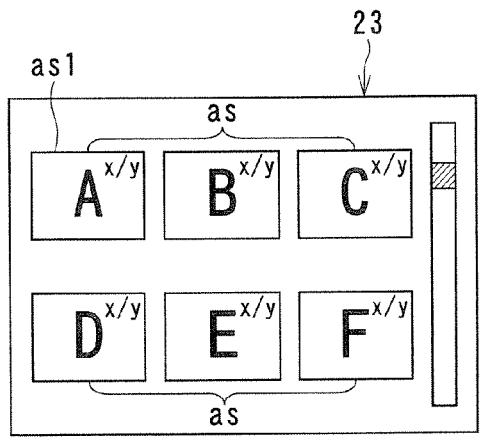
FIGS. 8A and 8B are diagrams illustrating examples of a thumbnail image of a typical pattern image of image data displayed on an image display unit in the image recording and playing system according to the present invention.
Figure 8B:
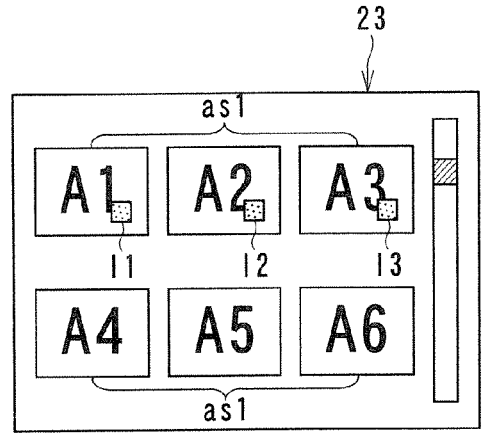
Figure 9:
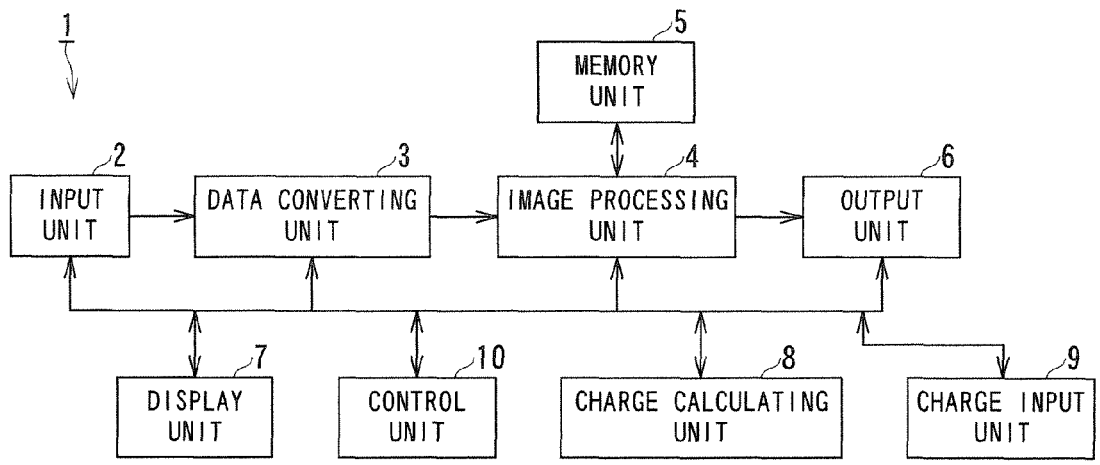
FIG. 9 is a functional block diagram showing the entire system control system in a conventional image recording and playing system.
Figure 10:
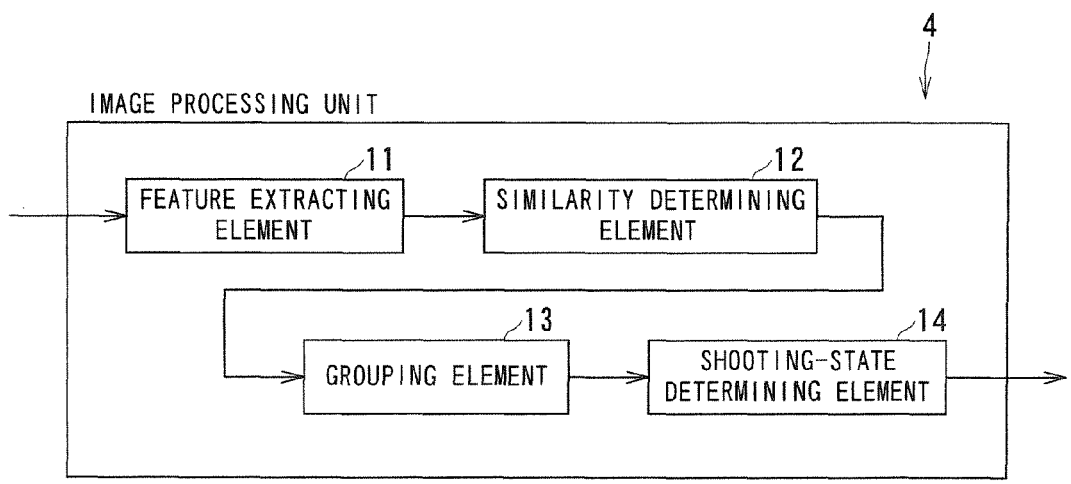
FIG. 10 is a functional block diagram showing an image processing unit shown in FIG. 9.
Figure 11:
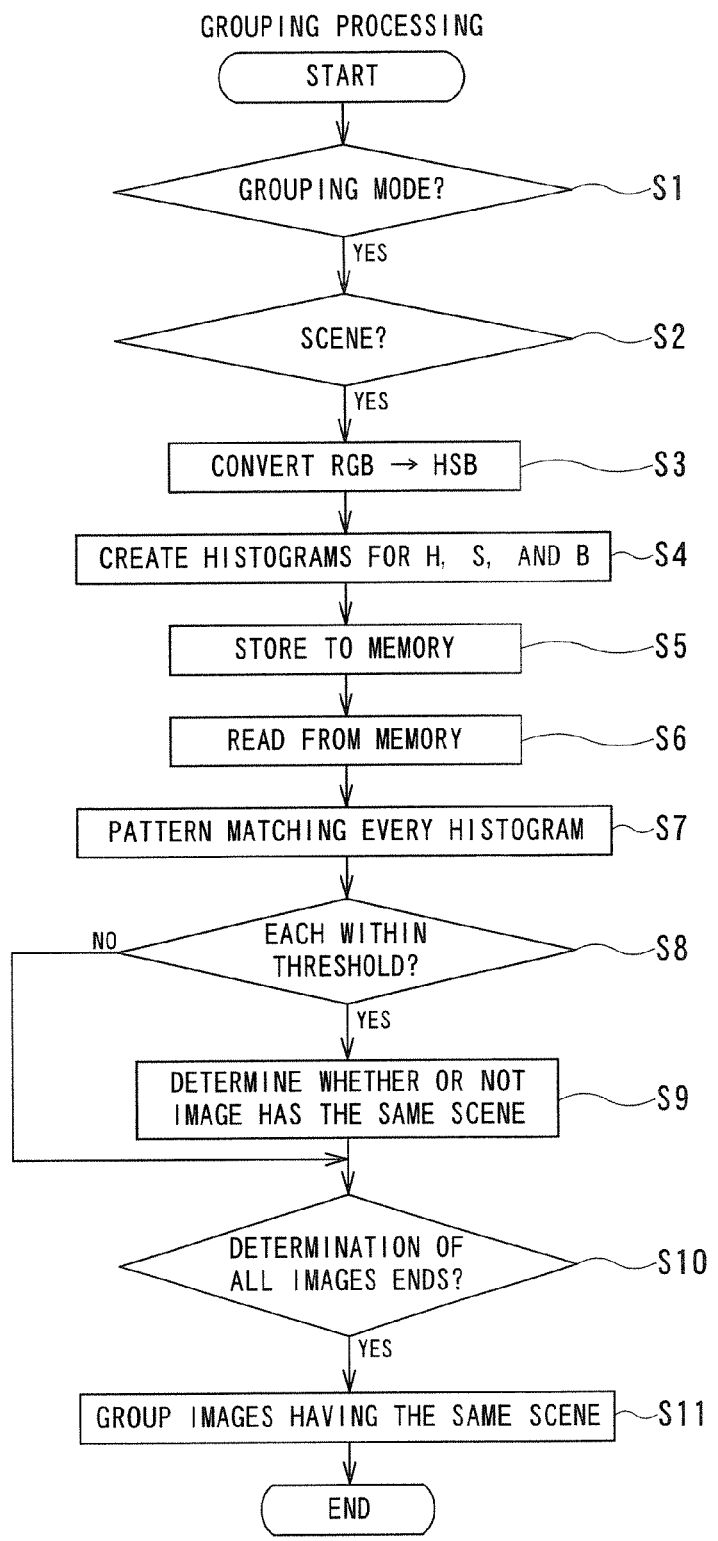
FIG. 11 is a flowchart for illustrating a grouping processing routine shown in FIG. 9.

FIGS. 8A and 8B are diagrams showing examples of a thumbnail image "as" of the typical pattern image of the image data "a" displayed on the image display unit 23 in the image recording and playing system 20, FIG. 8A is a diagram showing the thumbnail image "as" of the typical pattern image, and FIG. 8B is a diagram showing a plurality of images (e.g., six images) included in one thumbnail image "as1" in FIG. 8A.

As shown in FIG. 1, the image pickup unit 21 takes an image of a subject, and the image pickup unit 21 then creates the image data "a" of the subject image and transmits the created data to the calculation processing unit 22. In the calculation processing unit 22 that receives the image data "a", the first image-data creating element 26 determines the remaining memory capacity and selects the image deleting candidate. If the first image-data creating element 26 determines that the remaining memory capacity is lower than the required amount, the first image-data creating element 26 operates the image deleting candidate selecting function 32. Upon selecting the image deleting candidate with the image deleting candidate selecting function 32, first, the index creating/image analyzing function 33 shown in FIG. 2 performs index creation/image analysis. Subsequently, the image deleting candidate selecting process as shown in FIG. 3 is performed.

Next, a description will be given of the processing subsequent to that of the index creation/image analysis with reference to FIG. 3.

With the index creation/image analysis by using the index creating/image analyzing function 33 shown in FIG. 2, the image data "a1" having a value not more than a predetermined reference (threshold value) is extracted in step S15.

Subsequently, at least one desired piece of the typical-pattern image data "ax" is selected from among the extracted image data a1, and the image data "a1" similar to the typical-pattern image data "ax" is searched and extracted in step S16.

The extracted image data "a1" is subjected to the edge determining processing in step S17.

Referring to FIG. 8A, thumbnail images "as" (images A to F) comprising the dissimilar images are displayed on the screen of the image display unit 23 in step S18.

Subsequently, e.g., an A image as1 is selected from among the thumbnail images "as", and a plurality of images (e.g., six images A1 to A6) are displayed as shown in FIG. 8B. Among the plurality of the A images "as1" (images A1 to A6), the images A1 to A3 displays deleting candidate icons I1 to I3 that can delete data in step S19.

The deleting candidate icons I1 to I3 are automatically added to the A images as1 having relatively low image quality level. Therefore, if any of the images A1 to A3 or all of them are not necessary, the user of the image recording and playing system 20 can click the deleting candidate icons I1 to I3, thereby deleting the unnecessary image.

Reference symbol x/y is added to the images A to F serving as the thumbnail images (images having a drawing, resized to a plurality of regions) "as" as shown in FIG. 8A, and denotes the number x of unsharp images (e.g., 3 images) as the deleting candidate target to a parameter y (e.g., 6 images).

According to the present invention, the image recording and playing system 20 comprises: the image pickup unit 21 that takes the image; the calculation processing unit 22 that performs calculation processing of the image data "a" obtained by taking with the image pickup unit 21; the image display unit 23 that displays the image on the basis of the image processing data "a'" obtained by performing the calculation processing with the calculation processing unit 22; and the image data memory 24 that stores the image processing data "a'". The calculation processing unit 22 comprises: an image data storing element 25 that records predetermined image data a1 from among the image data "a" having a value not more than a predetermined threshold value from the result of the index creation/image analysis of the image based on the image data "a" taken by the image pickup unit 21; and an image data creating element 26 (27) that extracts one of the image data "a1" stored in the image data storing element 25, sets the extracted data as the typical-pattern image data "ax", extracts a plurality of image data "a1" similar to the typical-pattern image data "ax", and creates the thumbnail image data "a4". Therefore, a large number of the image data "a" stored in the image data memory 24 is set as the thumbnail images as and is displayed on the image display unit 23. Accordingly, it is possible to provide an image recording and playing system, with which the user can easily and simply perform the search operation of the image data "a" and the deletion of unnecessary images.

Further, the image recording and playing system 20 enables the improvement of the automation of the search operation of a large number of the image data "a" that is obtained by taking with the camera 20 as the image recording and playing system and is stored in the image data memory 24. Thus, the user can easily perform the search operation of the image data "a" in comparison with the conventional the image recording and playing system.

The second image-data creating element 27 in the image recording and playing system 20 has a function for extracting and grouping a plurality of the image data "a11" similar to the typical-pattern image data "ax" specified from among the dissimilar image data a1 and relatively determining whether or not the grouped image data "a11" is sharp, e.g., with the edge determining method. The resultant data can be displayed on the image display unit 23. Accordingly, the improvement of the sharpness of the image of the automatically extracted the image data "a11" enables the user of the camera 20 as the image recording and playing system to further easily perform the search operation of the image data.

Further, when the image display unit 23 determines the image data similar to the typical-pattern image data "ax" so as to display the similar image data, the image display unit 23 has the deleting candidate icon for viewing and deleting the image similar to the typical pattern image "as" (not shown). Thus, the operation of the image display unit 23 is further improved.

In addition, the image recording and playing method of the image recording and playing system 20 comprises the steps of: searching the dissimilar image data "a1" of the recorded image data; selecting the typical-pattern image data "ax" from the image data "a1" obtained by the search; searching the thumbnail image data "a4" similar to the typical-pattern image data "ax"; displaying the thumbnail image a based on the searched thumbnail image data "a4"; grouping the images similar to the displayed thumbnail image "as"; and relatively determining the unsharpness of a plurality of the grouped images "as1". Accordingly, since the image display unit 23 can display, as the thumbnail images "as", a large amount of the image data "a" stored in the image data memory 24, the user can easily and simply search for the image data and delete an unnecessary image.

Further, the image recording and playing method of the image recording and playing system 20 comprises the steps of: searching the dissimilar image data "a1" of the recorded image data "a"; selecting the typical-pattern image data "as" from the image data a1 obtained by the search step; searching the thumbnail image data "a4" similar to the typical-pattern image data "as"; displaying the thumbnail image "as" based on the searched thumbnail image data "a4"; grouping the images similar to the individual displayed thumbnail images "as"; relatively determining a plurality of the grouped images as1 based on the unsharpness as the reference; and displaying the determination result as an image every the plurality of the images "as1". Accordingly, the improvement of the sharpness of the automatically extracted image data "a11" facilitates the search for the image data for the user of the camera 20 as the image recording and playing system. Further, the thumbnail image "as" can be displayed with unsharpness so that the user can easily visually determine the image quality. Furthermore, the image display unit 23 can display the thumbnail image "as" based on a large amount of the image data "a" stored in the image data memory 24 and the user can easily perform the search operation of the image data "a" and the deletion of an unnecessary image.

Incidentally, the image recording and playing system 20 according to the present invention is not limited to that according to the embodiment. That is, the camera 20 as the image recording and playing system does not necessarily have the image pickup unit 21 and may be a device dedicated for image processing and play.

Further, with the image recording and playing system 20 according to the present invention, the index creating/image analyzing function 33 and the dissimilar image search function 34 are realized by the first image-data creating element 26, and the similar image search function 35 is realized by the second image-data creating element 27. However, the three functions 33, 34, 35 may not be specified to the two image data creating units 26, 27. Obviously, the image data creating unit comprising any of the two creating units 26, 27 or the two units 26, 27 as one unit may be used.

What is claimed is:

1. An image recording and playing system comprising:
an image pickup unit configured to take images;
an image data storing unit configured to store image data obtained from the image pickup unit;
an image processing unit configured to search the image data stored in the image data storing unit and to register dissimilar images which are not similar to other image data, the dissimilar images being stored in the image data storing unit; and
an image display unit configured to display the dissimilar images registered by the image processing unit, as thumbnail images,
wherein the image processing unit, when there are a plurality of image data to be registered as the dissimilar images, is configured to perform calculations (a), (b) and registration (c) repeatedly until a number of the dissimilar images registered by the image processing unit reaches a designated number, the calculation (a) is calculating a similarity between one of the image data stored in the image data storing unit and each of the dissimilar images stored in the image data storing unit, the calculation (b) is calculating an accumulation of the similarities calculated by the image processing unit when each similarity is within a threshold value determined in advance, and the registration registering the one of the image data as a dissimilar image of which the accumulation of the similarities is a minimum value.

2. The system according to claim 1, wherein the image processing unit is configured to read one image data from the image data storing unit in which is stored the image data registered as the dissimilar images, to calculate the similarity between the one image data read from the image data storing unit and each of other image data stored in the image data storing unit, and to register the image data, of which the similarity is not less than a similarity threshold value, as the image data being similar to the one image data read from the image data storing unit.

3. The system according to claim 1, wherein the similarity is a value calculated in accordance with at least one difference of histograms for H (hue), S (saturation) and B (brightness) and becomes lower with increasing the difference of the histograms.

4. The system according to claim 1, wherein
the image processing unit is configured to determine whether similar images grouped as a same group are sharp or unsharp, and
the image displaying unit is configured to display the images determined to be unsharp so as to allow a user to easily visually determine an image quality of the displayed images.

5. An image recording and playing method comprising:
taking an image;
storing image data obtained by taking the image in an image data storing unit;
searching, by an image processing unit of an image recording and playing system, image data from all stored image data and registering, by the image processing unit, the image data which are not similar to each other as dissimilar images; and
displaying the registered dissimilar images as a thumbnail images,
wherein the registering step includes, when there are a plurality of image data to be registered as the dissimilar images, performing calculations (a), (b) and registration (c) repeatedly until a number of the dissimilar images registered by the image processing unit reaches a designated number, the calculation (a) is calculating a similarity between one of the image data stored in the image data storing unit and each of the dissimilar images stored in the image data storing unit, the calculation (b) is calculating an accumulation of the similarities calculated by the image processing unit when each similarity is within a threshold value determined in advance, and the registration (c) is newly registering the one of the image data as a dissimilar image of which the accumulation of the similarities is a minimum value.

6. The method according to claim 5, wherein the registering step includes:
reading one image data from the image data storing unit in which is stored the image data registered as the dissimilar images;
calculating the similarity between the one image data read from the image data storing unit and each of other image data stored in the image data storing unit; and
registering the image data, of which the similarity is not less than a similarity threshold value, as the image data being similar to the one image data read from the image data storing unit.

7. The method according to claim 5, wherein the similarity is a value calculated in accordance with at least one difference of histograms for H (hue), S (saturation) and B (brightness) and becomes lower with increasing the difference of the histograms.

8. The method according to claim 5, wherein
the registering step includes determining whether similar images grouped as a same group are sharp or unsharp, and
the displaying step includes displaying the images determined to be unsharp so as to allow a user to easily visually determine an image quality of the displayed images.

* * * * *